Oct. 6, 1936.　　A. WINTERHALTER ET AL　　2,056,879
HANDLE AND CLOSURE ATTACHMENT FOR CONTAINERS
Filed Nov. 5, 1935
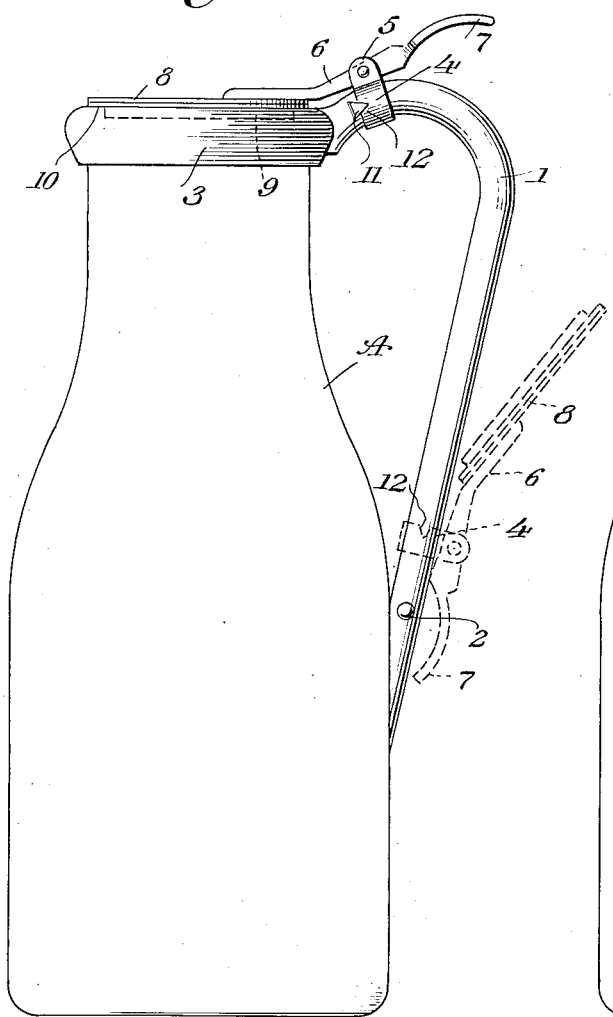
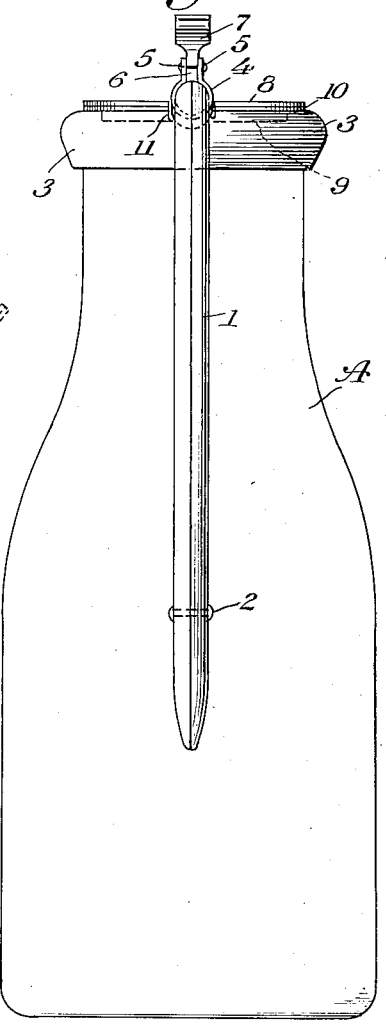
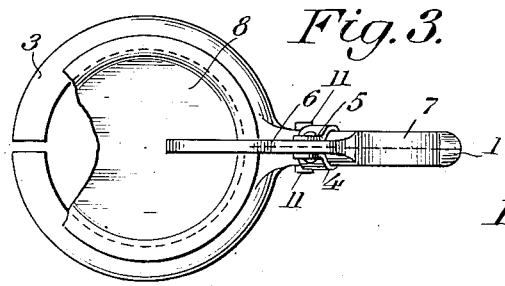
Adam Winterhalter
Edward Winterhalter
INVENTOR
BY Victor J. Evans & Co.
ATTORNEYS Patented Oct. 6, 1936

2,056,879

UNITED STATES PATENT OFFICE 2,056,879

HANDLE AND CLOSURE ATTACHMENT FOR CONTAINERS

Adam Winterhalter and Edward Winterhalter, West New Brighton, Staten Island, N. Y.

Application November 5, 1935, Serial No. 48,384

3 Claims. (Cl. 215—100)

This invention relates to attachments for containers, and its general object is to provide a handle and closure device that is primarily designed for use with milk bottles for detachable connection thereto in a manner whereby it can be easily and expeditiously removed, but accidental removal is impossible.

A further object of the invention is to provide a handle and closing device for milk bottles, that includes means to completely surround the lip of the bottle and to close the mouth thereof so as to retain the contents in a clean and sanitary condition.

Another object of the invention is to provide a handle and closure device of the character set forth, that is simple in construction, inexpensive to manufacture and extremely efficient in operation, use and service.

This invention also consists in certain other features of construction and in the combination and arrangement of the several parts, to be hereinafter fully described, illustrated in the accompanying drawing and specifically pointed out in the appended claims.

In describing our invention in detail, reference will be had to the accompanying drawing wherein like characters denote like or corresponding parts throughout the several views, and in which:

Figure 1 is a side view illustrating the application of our device to a milk bottle, with the closure in operative position in full lines and out of use in dotted lines.

Figure 2 is a rear view thereof.

Figure 3 is a top plan view of the device per se, with parts broken away.

Referring to the drawing in detail, the letter A indicates a milk bottle of the usual construction in that it includes a body, a neck and the usual bead or lip formed with the upper end thereof and which includes an annular shoulder to receive the usual cap.

Our device includes a handle 1 which as shown is made up of a pair of sections of like shape of semi-circular cross sectional configuration to provide outer rounded surfaces and inner flat faces. The sections are secured together adjacent their lower ends, by a rivet 2 or the like, and are formed from resilient material, so that they will normally spring apart for a purpose which will be presently apparent. The lower ends of the sections are beveled so as to follow the shape of the bottle, as best shown in Figure 1, and the flat faces are arranged in face to face relation, so that the sections cooperate to provide a handle of circular cross sectional shape.

The major portions of the sections are disposed at an inclination directed toward the bottle, but the upper portion of the sections are curved in gooseneck formation, and arranged with respect to the inclined portions, to provide ample space between the handle and the bottle, as shown in Figure 1.

Formed on or otherwise secured to the curved portions of each section is a channeled semi-circular member 3 disposed in curved formation to follow the shape of the bead of the bottle, and the channels thereof are shaped to fit the bead so as to provide a pocket therefor.

Mounted for slidable movement on the handle is a collar 4 that includes apertured ears 5 to receive a pivot pin for pivotally securing an arm 6 thereto, and the arm is provided with a flattened outer portion 7 that is curved to form a finger piece, as shown.

Secured to the opposite end portion of the arm 6 is the closure of our device which includes a cover plate 8 of a diameter to rest upon the semi-circular members 3 when in use and secured to the underside of the cover plate 8 is a cap member 9 of a size to fit the annular shoulder of the bead or lip of the bottle. The cap member is in the form of a plug and surrounding the same is a gasket 10 to contact the upper surface of the channel members to provide a tight connection therewith when the closure is in use.

Formed on the curved portion of the handle and arranged upon diametrically opposite sides thereof are substantially V-shaped projections 11 which are disposed adjacent the juncture of the sections with the channeled members and in the path of like shaped recesses 12 in the collar 4, to limit the movement of the closure, and to hold the collar substantially rigid, to facilitate its operation to open and closed positions. The sections may be hollow and in that event the projections 11 are stamped therefrom and outwardly bent for the purpose set forth.

In the use of our device, the channeled members 3 are disposed about the lip of the bottle, thence the collar is moved upwardly from the dotted line position of Figure 1 to the full line position thereof, to hold the channeled members in fixed association about the lip, as well as to position the closure for use. When the collar is so arranged, it will be obvious that it is practically impossible for the device to be casually removed from the bottle, but when it is desired to move the same, the collar is merely moved to the dotted line position which will result in the free portions of the sections separating, and moving the channeled members 3 accordingly.

It is thought from the foregoing description that the advantages and novel features of our invention will be readily apparent.

We desire it to be understood that we may make changes in the construction and in the combination and arrangement of the several parts, provided that such changes fall within the scope of the appended claims.

What we claim is:

1. A receptacle attachment comprising a handle, receptacle clamping members secured to the handle, and means slidably mounted on the handle for disposing the clamping members into and out of clamping association, and receptacle closure means carried by the slidably mounted means.

2. A receptacle attachment comprising a handle, receptacle clamping means secured to the handle, means slidably mounted on the handle for disposing the clamping means into and out of clamping association, receptacle closure means carried by the slidably mounted means, and a handle for the closure means and carried by the slidably mounted means.

3. A milk bottle attachment comprising a handle including cooperating sections secured together at one end and free for their remaining portions, a channeled bottle bead receiving member secured to each section, a collar mounted for slidable movement on the sections for disposing the free portions into and out of engagement and the bead, receiving members into and out of clamping association, a closure for the bottle, a handle for the closure and pivotally secured to the collar, and means to limit the movement of the collar.

ADAM WINTERHALTER.
EDWARD WINTERHALTER.